(12) United States Patent
Wald

(10) Patent No.: US 9,489,803 B2
(45) Date of Patent: *Nov. 8, 2016

(54) GAMING SYSTEM WITH INCREASING ODDS OF WINNING

(71) Applicant: Justin Wald, Seattle, WA (US)

(72) Inventor: Justin Wald, Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/104,256

(22) Filed: Dec. 12, 2013

(65) Prior Publication Data

US 2014/0113699 A1 Apr. 24, 2014

Related U.S. Application Data

(63) Continuation of application No. 12/696,485, filed on Jan. 29, 2010, now Pat. No. 8,632,385.

(51) Int. Cl.
| | |
|---|---|
| *G07F 17/32* | (2006.01) |
| *A63F 9/24* | (2006.01) |
| *A63F 13/00* | (2014.01) |
| *A63F 13/24* | (2014.01) |

(52) U.S. Cl.
CPC ............. *G07F 17/3262* (2013.01); *A63F 9/24* (2013.01); *A63F 13/00* (2013.01); *G07F 17/32* (2013.01); *G07F 17/323* (2013.01); *G07F 17/3244* (2013.01); *G07F 17/3267* (2013.01); *G07F 17/3286* (2013.01); *A63F 13/24* (2014.09); *G07F 17/326* (2013.01)

(58) Field of Classification Search
CPC .................................................... G07F 17/326
USPC ........................................................ 463/20
See application file for complete search history.

(56) References Cited

U.S. PATENT DOCUMENTS

| | | | |
|---|---|---|---|
| 6,210,275 B1* | 4/2001 | Olsen ...................... | G07F 17/32 273/138.1 |
| 6,572,471 B1* | 6/2003 | Bennett .......................... | 463/16 |
| 6,602,137 B2 | 8/2003 | Kaminkow et al. | |
| 6,648,754 B2* | 11/2003 | Baerlocher ............. | G07F 17/32 463/12 |
| 6,719,632 B2* | 4/2004 | Palmer .................... | G07F 17/32 463/20 |
| 7,326,115 B2 | 2/2008 | Baerlocher | |
| 7,419,159 B2 | 9/2008 | Dodge | |

(Continued)

OTHER PUBLICATIONS

ClassicGamesArcade.com—Minesweeper—(Aug. 24, 2007)—http://web.archive.org/web/20070824095040/http://www.classicgamesarcade.com/game/21649/Minesweeper.html.

(Continued)

*Primary Examiner* — Kang Hu
*Assistant Examiner* — Anh Vo V Nguyen
(74) *Attorney, Agent, or Firm* — Greenblum & Bernstein, P.L.C

(57) ABSTRACT

A system and method for operating gaming systems, such as casino gaming systems and methods, is provided with increasing or improving odds of winning. A display device displays a play area or game board having a plurality of interactive regions some of which are winning regions with others being losing regions. A player may select a region for wagering a fixed wager amount. When the player selects a winning region, the player may elect to take the payout or play at least one additional round of play with the payout. The probability of winning in each additional round of play is increased while increasing the payout by the fixed wager amount. When a losing region is selected, the payout accumulated from the rounds of play is lost. The game mechanic provides for long sequences of wins, or winning streaks, to attract players while reducing variance caused by large jackpot payouts.

22 Claims, 10 Drawing Sheets

(56) References Cited

U.S. PATENT DOCUMENTS

| | | | |
|---|---|---|---|
| 7,731,582 B2* | 6/2010 | Randall | G07F 17/3267 463/20 |
| 8,221,206 B2* | 7/2012 | Marks | G07F 17/32 463/16 |
| 2002/0077168 A1 | 6/2002 | Jones et al. | |
| 2002/0155879 A1* | 10/2002 | Walker et al. | 463/20 |
| 2003/0045338 A1* | 3/2003 | Dolloff | G07F 17/3262 463/16 |
| 2003/0045344 A1* | 3/2003 | Webb et al. | 463/20 |
| 2003/0060253 A1* | 3/2003 | Kaminkow et al. | 463/16 |
| 2003/0064794 A1* | 4/2003 | Mead et al. | 463/25 |
| 2004/0053680 A1* | 3/2004 | Schultz | G07F 17/32 463/20 |
| 2005/0250574 A1* | 11/2005 | Kane et al. | 463/17 |
| 2006/0030401 A1* | 2/2006 | Mead | G07F 17/32 463/22 |
| 2006/0073871 A1* | 4/2006 | Rodgers et al. | 463/17 |
| 2006/0223605 A1* | 10/2006 | Pullman | A63F 1/00 463/16 |
| 2007/0054721 A1* | 3/2007 | Jackson | G07F 17/3211 463/13 |
| 2007/0293308 A1 | 12/2007 | Jackson et al. | |
| 2008/0004105 A1* | 1/2008 | Cregan et al. | 463/20 |
| 2008/0058099 A1* | 3/2008 | Schwartz | G07F 17/32 463/29 |
| 2008/0085761 A1* | 4/2008 | Bagwell | A63F 9/24 463/22 |
| 2008/0132307 A1* | 6/2008 | Toyoda | G07F 17/32 463/13 |
| 2008/0188289 A1 | 8/2008 | Baerlocher | |
| 2008/0268937 A1 | 10/2008 | Bryant et al. | |
| 2008/0272541 A1 | 11/2008 | Walker et al. | |
| 2008/0274801 A1 | 11/2008 | Bryant et al. | |
| 2009/0093291 A1* | 4/2009 | Gomez | 463/16 |
| 2009/0124316 A1 | 5/2009 | Baerlocher et al. | |
| 2009/0124358 A1* | 5/2009 | Acres | G07F 17/32 463/25 |
| 2009/0264175 A1* | 10/2009 | Goto | G07F 17/323 463/17 |
| 2010/0016058 A1* | 1/2010 | Englman et al. | 463/20 |
| 2010/0234093 A1* | 9/2010 | Gomez et al. | 463/20 |
| 2010/0304825 A1 | 12/2010 | Davis et al. | |
| 2011/0269525 A1 | 11/2011 | Jaffe | |

OTHER PUBLICATIONS

Wikipedia, the free encyclopedia "ODDS" hlp://en.wikipedia.org/wiki/odds (last modified Sep. 18, 2009).

* cited by examiner

GAMING SYSTEM WITH INCREASING ODDS OF WINNING

RELATED APPLICATIONS

The present application is a continuation of U.S. patent application Ser. No. 12/696,485, filed Jan. 29, 2010, now U.S. Pat. No. 8,632,385, the disclosure of which is hereby incorporated herein by reference in its entirety.

FIELD OF THE INVENTION

The present invention generally relates to gaming systems and methods for operating gaming systems, and more particularly, to gaming systems, such as casino gaming systems with increasing or improving odds of winning, and methods for operating such gaming systems.

BACKGROUND OF THE INVENTION

Current casino games come primarily in two fundamental flavors, which most gamblers are familiar, each of which have their own strengths and shortcomings. The first type of casino game is a "1:1 payout game," which generally offers a player a near 50% chance at winning in exchange for an even-money payout. A pass line bet at craps or a banker bet at baccarat are classic examples of this sort of wager. These games are popular and often attract high rollers who bet large sums of money on each wager, and often require physical mediums (roulette wheels, cards, etc.), dealers, and large amounts of floor space.

The second type of casino game is a "X:1 payout game," in which a player trades frequent small losses for a tiny chance at a large payout. Slots are the classic example of this sort of game, and gamblers are attracted by the prospect of winning big. Often implemented on electronic mediums, slot machines require relatively little overhead and generate a proportionally large amount of profit per square foot. The average wager at slot machines tends to be much smaller than at 1:1 games, and most players do not expect to win on any given bet. Innovation has been extremely limited in this space, consisting mostly of putting new graphics, themes, and bonus games on top of the same basic game mechanic.

U.S. Patent Application Publication No. 2008/0188289 to Baerlocher discloses a gaming device having a game which requires the same average investment from a player to win an award, including a jackpot award, regardless of the amount that the player bets at any one time. The award can be unchanging, e.g., $10,000, each time a player plays the gaming device. The award can also vary such as with a progressive jackpot i.e., the jackpot builds until a player "hits" the jackpot. The game enables the average investment necessary to win the jackpot to be uniform by varying the odds of winning the jackpot as the player's bet varies. That is, a player betting less money needs to play the game more times, on average, to win the jackpot. Likewise, a player betting more money needs to play the game less times, on average, to win the jackpot. According to Baerlocher, the average overall bet or investment thus remains constant despite the player's betting habits or betting ability.

Gamblers can be impulsive, superstitious, risk-seeking, or risk-averse at various points in time and may not think of a penny saved as being equivalent to a penny earned. Instead, winnings are often called "sugar" or "playing with house money". The players may also not treat sequential wagers as independent, instead creating a mental link between them. Accordingly, some players are often willing to take larger risks when on a winning streak than they would when starting from square one. In a 1:1 payout game, it is not uncommon for a player to win a wager and then "let it ride", electing to parlay another roughly 50% chance at winning even more money. When such an endeavor is unsuccessful, the player may mentally consider the sequence, with the perception of only have taken a net loss of the amount of the initial wager. This perception is preferable to the emotional anguish of admitting that they actually won the first wager but then independently made and lost a bigger wager.

This sort of mentality is not limited to gamblers on a casino floor. It can be readily observed in the stock market as well, with investors who have a hard time bringing themselves to sell a stock which is presently below the original purchase price. They may consider only the purchase and sale prices when evaluating the transaction, because internalizing all of the ups and downs in between as actual profit and loss is emotionally taxing. Rather than "locking in a loss", they tend to wait for the security to rebound to a higher price. They may find this preferable to admitting that the loss has already occurred and then making an independent decision about the future prospects of the investment.

While winning more than 50% of the time would be very attractive to gamblers, doing so in a way that is still profitable to the house or gambling establishment requires "laying odds." However, many casual players would be uncomfortable with the idea of laying odds because it entails risking far more funds than one stands to win if successful. Also, with a traditional gaming machine such as a slot machine, the house assumes a large degree of variance in the prospect of the player hitting a large jackpot. Though unlikely, a series of large player jackpots in quick succession could put an appreciable dent in house profits. As such, a player "laying odds" in a classical manner could take large losses quickly due to a run of particularly bad luck.

The present invention overcomes these player psychological barriers to laying odds for winning more than 50% of the time while still providing profit opportunities to the gambling establishment. The present invention provides a gaming system and a method for operating a gaming system where a player can be more comfortable with laying odds while winning more than 50% of the time, and the odds of winning actually improve as play is continued. In addition to the benefits of hosting a game with high player appeal, the game mechanic of the present invention offers another advantage to the gaming establishment or house in the form of reduced variance caused by large jackpot payouts.

SUMMARY OF THE INVENTION

In a first aspect of the invention, a system implemented in hardware, such as a computing system or computer gaming system, provides for playing at least one round of a game. The system includes at least one memory device, such as a computer readable memory and a computer readable storage media, at least one processor or CPU, at least one input device, and a display device. The at least one memory device may store a plurality of instructions and/or store data. The at least one processor may process instructions from the at least one memory device, and processes player choices input from the least one input device. The at least one input device inputs player choices to the at least one processor. The display device displays a play area generated by the at least one processor, and has a plurality of interactive regions where a player may select a region for wagering a fixed wager amount using an input device. The interactive regions include winning regions and losing regions as determined by the at least one processor. When the player selects a winning region the player may elect to take the payout or play at least one additional round of play with the payout where the probability of winning in each additional round of play is increased by the processor while increasing the payout by the fixed wager amount. When the player selects a losing region, the payout accumulated from all rounds of play is lost.

In an additional aspect of the present invention, a method is implemented for operating a gaming system for playing at least one round of a game. The method may implemented in a computer infrastructure having computer executable code tangibly embodied on a computer readable storage medium having programming instructions operable to display a play area generated by at least one processor or CPU on a display device, the play area having a plurality of interactive regions where a player may select a region for wagering a fixed wager amount using an input device. The interactive regions include winning regions and losing regions as determined by the at least one processor or CPU. An input from at least one input device of a player selection of an interactive region is accepted by the at least one processor. When a winning region is selected, the payout may be paid or used in at least one additional round of play. In each additional round of play, the at least one processor increases the probability of winning in each additional round of play while increasing the payout by the fixed wager amount. When a losing region is selected, the payout accumulated from all rounds of play is lost.

In a further aspect of the invention, a computer program product comprises a computer usable storage medium having readable program code embodied in the storage medium. The computer program product includes at least one component operable to: display a play area generated by at least one processor on a display device, the play area having a plurality of interactive regions where a player may select a region for wagering a fixed wager amount using an input device, the interactive regions comprising winning regions and losing regions as determined by said at least one processor, and accept an input from at least one input device of a player selection of an interactive region, wherein when a winning region is selected, the payout may be paid or used in at least one additional round of play where the probability of winning in each additional round of play is increased while increasing the payout by the fixed wager amount, and when a losing region is selected, the payout accumulated from all rounds of play is lost.

BRIEF DESCRIPTION OF THE DRAWINGS

The present invention is described in the detailed description which follows, in reference to the noted plurality of drawings by way of non-limiting examples of exemplary embodiments of the present invention wherein.

DETAILED DESCRIPTION OF THE INVENTION

Figure 1:
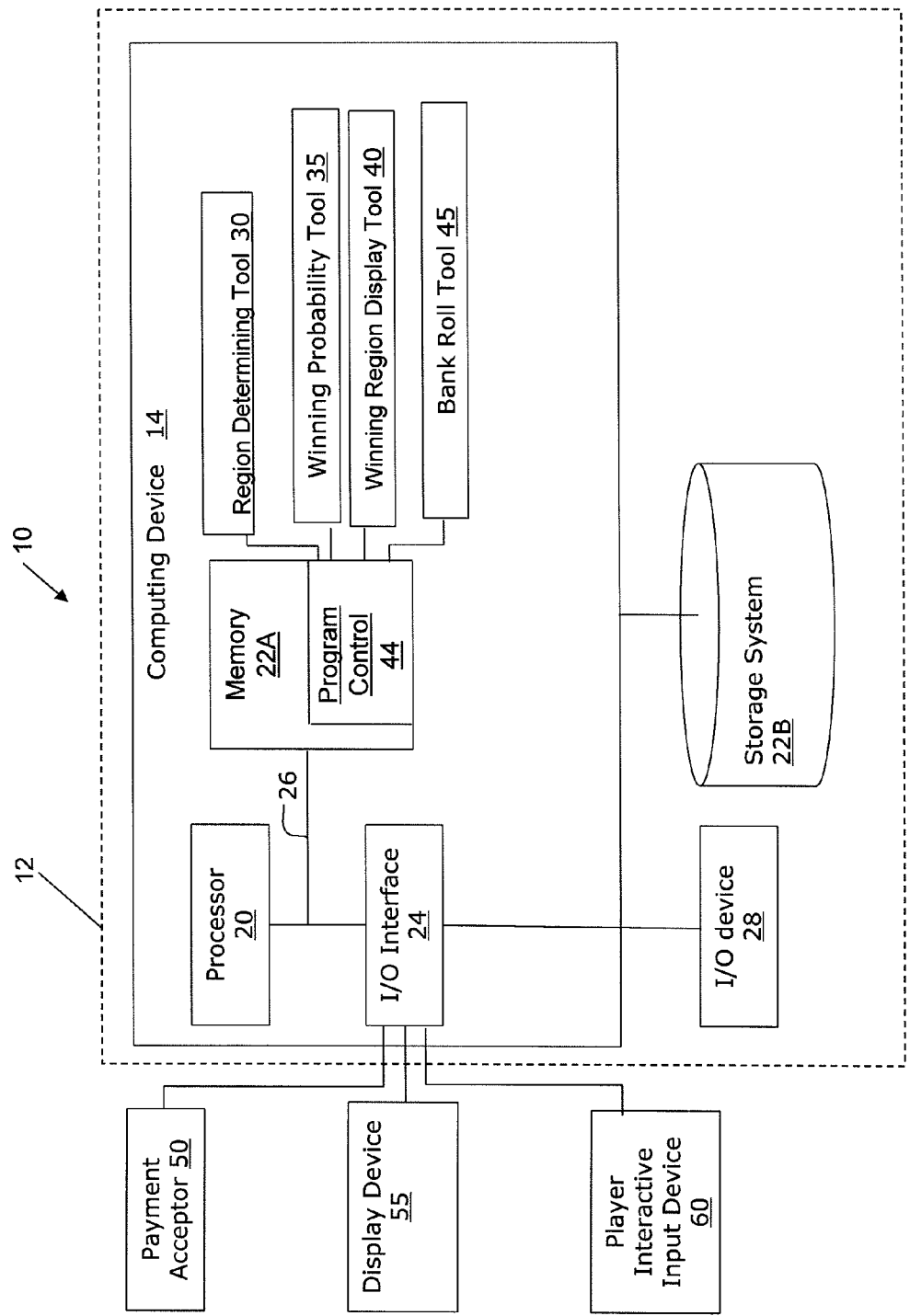
FIG. 1 shows an illustrative environment for implementing the steps in accordance with aspects of the invention.

The present invention generally relates to a system and method for operating gaming systems, in particular to a gaming system and method for operating a gaming system, such as a casino gaming system and method, with increasing or improving odds of winning. A new fundamental class of game that is psychologically more appealing to the player while at the same time statistically more advantageous to the house is provided by the present invention. In embodiments of the invention, for example, a player begins by making an even money wager. If the player wins and is willing to press his or her luck, instead of the payout increasing (as in existing "double-or-nothing" games), the present invention improves the odds of the player winning the next wager. This game mechanic leads to long sequences of wins and a very satisfying experience for the player.

In embodiments of the invention an entirely new class of electronic casino gaming is provided, which is the "1:X payout game". In a 1:X game, the player trades many small wins for the occasional large loss. In this manner, it is effectively the inverse of a traditional slot machine where many small losses are traded are traded for an occasional large win. Today's gambler is not accustomed to the possibility of playing a casino game which will result in a win much more than 50% of the time, and the prospect must certainly be appealing to the player. This sort of psychology affords a way to make the player more comfortable with laying odds. In embodiments of the invention, accumulated winnings may be employed in subsequent rounds of the game at increasing odds of winning. Instead of trying to convince a player to make the leap of immediately wagering 9 units for a 90% chance of winning 1 unit, the player may win his or her way into such a situation. Wagering 9 "won" units for a 90% chance at winning another is a much more appealing prospect than wagering 9 units "out of pocket".

For example, in embodiments of the invention, the mechanics of a game may begin very similar to a 1:1 game, offering the player a slightly less than 50% chance at returning 1 unit profit on a 1 unit wager. Contrary to a traditional 1:1 game, a player who chooses to "let it ride," or bet accumulated winnings from one or more previous rounds of play in the next round of play, in the present invention would not stand to win two or more additional units on the second or subsequent wager. The player would again stand to win 1 additional unit (for a total of 3 instead of 4). In the present invention, in lieu of extra profit, the player would receive an increased chance at victory. Now that the player is effectively wagering 2 units to win 1 additional unit, the player receives slightly less than a 66% chance at victory. The successful player can than continue to wager 3 units to win 1 at a slightly less than 75% chance at victory, and so on. Accordingly, in the present invention, a game is provided, for example, in which the player's odds actually improve as he or she plays.

The psychological appeal of the game of the present invention is enhanced by the greater joy of winning more often compared to the magnitude of a win or loss. For example, while winning $100 feels better than winning $10, it does not feel close to 10 times as good. On this premise, it stands to reason that the game mechanic of the present invention would be more emotionally rewarding to player psychology than traditional 1:1 or X:1 payout games. In a game where the player is effectively laying odds, the player can experience the satisfaction of victory significantly more often than the agony of defeat. Although the house advantage, or increased odds in favor of the gaming establishment in the present invention need not be different than a traditional slot machine, the traditional slot player has never before had a chance at such frequent victory.

The present invention, in addition to the benefits of hosting a game with high player appeal, provides another advantage to the house in the form of reduced variance in payout amounts. In a traditional slot machine, the house assumes a large degree of variance in the prospect of the player hitting a large jackpot, or although less likely, a series of large player jackpots in quick succession. However, in embodiments of the present invention, the player may only win one unit for each victory, so the house or gaming establishment or owner is not exposed to such violent swings. It is the player who incurs the occasional large loss, coming at the end of a successful streak that was pushed just a little too far. It would take many more trials with a gaming system of the present invention than with a slot machine for the player to accrue a huge win, thereby reducing variance. In the game mechanic of the present invention, an initial even-money wager leads to future wagers where the player is using many units to win one more, but at constantly improving odds.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet, or
- a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein using a computing device 14. The computing device 14 may include a random interactive region determining tool 30, a winning probability tool 35, a winning region display tool 40, and a bank roll tool 45. These tools are operable to: a) perform a random determination or assignment whether an interactive region is a losing region or a winning region, b) calculate the probability of winning for a round of play and display the probability, c) indicate or display whether a player selected interactive region is a winning region or a losing region on the display, and displays which remaining regions are winning regions and which regions are losing regions, and d) determine the player's bankroll or available funds, the round of play, and the payout for the round of play, and display the bankroll or available funds, the fixed wager amount, the round of play, and the payout for the round of play, e.g., the processes described herein.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution.

Further, the computing device 14 is in communication with an external I/O device/resource 28. The I/O device 28 can interact with the computing device 14 or any device that enables the computing device 14 to communicate with one or more other computing devices using any type of communications link. The external I/O device/resource 28 may be keyboards, displays, pointing devices, etc. Additionally, in embodiments, the computing device 14 includes a storage system 22B. Moreover, as shown in FIG. 1 and explained further below, the computing device 14 is in communication with a plurality of player input and output devices, such as a payment acceptor 50, a display device and a sound device 55 and a player interactive input device 60.

The processor 20 executes computer program code (e.g., program control 44) processes on computer media, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
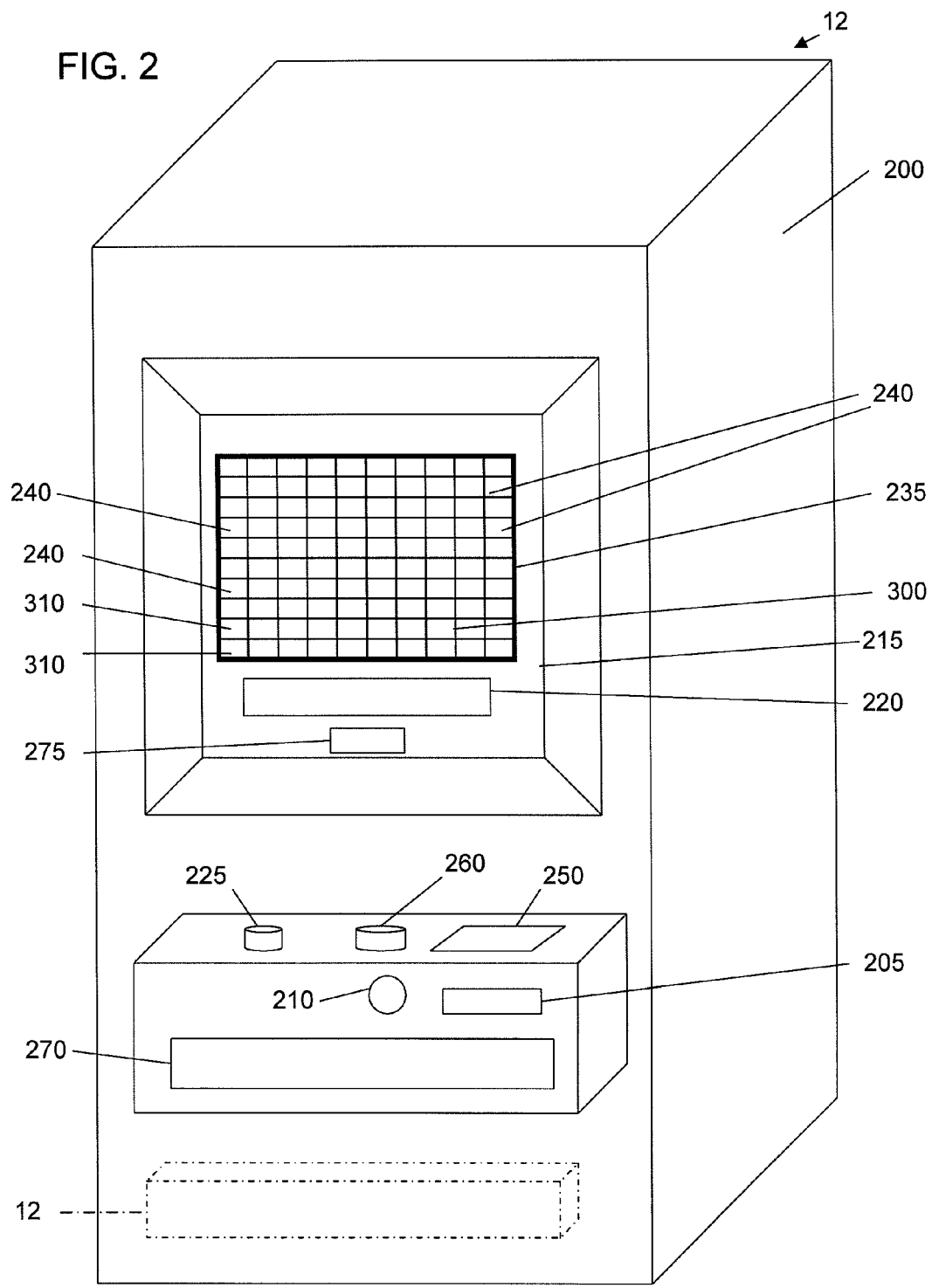
FIG. 2 shows an exemplary gaming system for playing at least one round of a game in the form of a gaming device with exemplary user interfaces which implement the processes in accordance with aspects of the invention.

In embodiments of the invention, a gaming system for playing at least one round of a game in accordance with the present invention may be in the form of a gaming device 200 as illustrated in FIG. 2 which includes an environment 10, with a computer infrastructure 12, as illustrated in FIG. 1 for managing the processes in accordance with the invention. As shown in FIG. 2, the gaming device 200 may include a bill or card acceptor 205 for accepting paper money or credit cards, or other sources of payment, and a coin slot 210 for accepting coins or tokens for payment for playing a game. Upon inserting the proper payment in the bill or card acceptor 205 or coin slot 210, the amount deposited or number of game credits or units may be displayed on the display 215 in a game information section 220 of the display 215. In embodiments of the invention, there may be one or more than one information section 220 at different locations on the display 215, for displaying different types of information, such as bank roll information and probability of winning, operating instructions, and game results such as whether a round was won or lost.

After making the payment, the player may start a game by pressing a play button 225. The play button 225 may be any conventional game play button for starting a game or for starting a sequence of events in the gaming device 200. Pressing the play button 225 to start a game may also cause generation of play area 235 on the display 215. The play area 235 may have a plurality of interactive regions 240 where a player may select a region 240 for wagering a fixed wager amount using an input device 250, such as a touch pad for controlling the position of a screen cursor on the play area 235. The input device 250 may also be used to input the selection of the selected interactive region 240, such as by tapping the touch pad in conventional manner, or a separate input device, such as a button (not shown) may be employed to input the selection when the cursor is placed on the desired interactive region 240 chosen by the player.

Exemplary of input devices which may be employed to select an interactive region 240 to wager on includes conventional input devices such as a touch screen, a computer mouse, a joystick, a keyboard, a track ball, or one or more buttons. In preferred embodiments, the display 215 is a touch screen display where a player may choose an interactive region 240 in the play area 235 by touching the particular interactive region 240 of choice. In embodiments of the invention, the touch screen may be employed to both select the interactive region and to input the chosen region as the selected region. In other embodiments, the touch screen may be employed to select the interactive region, and then a separate button may be used to input that chosen region as the selected region upon the wager is made.

In embodiments of the invention, a cash out button 260 may be employed by the player to end a game and cash out or collect the bank roll and any accumulated or won payout funds in the player's account. The funds collected on cashing out may be collected in a payout tray 270 in the form of coins or bills, tokens, or credit vouchers or cards, or other forms of payment.

In embodiments of the invention, a wager button for placing a wager in a first round, and a continuation button for continuing on to another round may be included on the gaming device along with the cash out button 260. In preferred embodiments, a wager button 275 (shown for example in FIGS. 3, 14, and 17), and a continuation button (shown for example in FIGS. 5, 7, 9, 11, 13, 15, 16, and 18) are included as one or more than one interactive sections on the display 215, for example in or adjacent the game information section 220. In embodiments, an interactive cash out button 280 (shown for example in FIGS. 4, 6, 8, 10, and 12), may be included as interactive section on the display 215 in addition to or in place of cash out button 260 on the gaming device. Pressing or activation of the interactive cash out button 280 on the display may generate a display showing the total or final bank roll which includes any payout amount, and may offer a new game using the final or total bank roll from the previous game.

In embodiments of the invention, the Random Interactive Region Determining Tool 30 randomly determines whether an interactive region 240 is a losing region or a winning region. The random assignment or determination as to whether each region is a winning region or a losing region is made for each round of play so that the winning regions and the losing regions are changed for each round of play. A random number generator may be employed to randomly determine which regions are the winning regions and which regions are the losing regions. The proportion of winning regions to losing regions may be calculated and ensured for each round of play. In embodiments, the proportion or ratio of winning regions to losing regions does not depend upon a random number generator and may be assigned, preset, or predetermined for each round of play. In embodiments of the invention, the ratio or proportion of winning regions to losing regions may be assigned to be about equal to the probability of winning.

In embodiments, the Winning Probability Tool 35 calculates or assigns the probability of winning a round of play and displays the probability of winning on the display 215 in the information section 220. In embodiments of the invention, the actual win percentage or real odds or probability of winning (W) for a game may be calculated as:

$$W=F \times P$$

where W is the actual winning percentage or real odds or probability of winning for a game, F is the fair odds of winning a game, calculated according to the formula:

$$F=N/(N+1),$$

where N is the number of the round which is being played, and

P is the desired payback percentage, calculated according to the formula:

$$P=100\%-H,$$

where H is the house advantage percentage.

In embodiments of the invention, after the player selects an interactive region 240, the Winning Region Display Tool 40 indicates whether the selected region is a winning region or a losing region on the display 215 in the play area 235 or in the information section 220, and preferably displays which remaining interactive regions 240 are winning regions and which interactive regions 240 are losing regions. After optionally displaying which interactive regions 240 are winning regions and which regions are losing regions, then upon start of the next round of play the Winning Region Display Tool 40 no longer displays which interactive regions 240 are winning regions and which interactive regions 240 are losing regions. In other embodiments of the invention, the Winning Region Display Tool 40 may only display whether the player won or lost without displaying exactly which regions were winners or losers.

In embodiments of the invention, the Bank Roll Tool 45 determines the player's bankroll or available funds, the round of play, and the payout for the round of play, and displays the bankroll or available funds, the fixed wager amount, the round of play, and the payout for the round of play on the display 215 in the information section 220.

Exemplary of the play areas 235 or game board which may be displayed on the display 215 are a spinning wheel, a roulette wheel, a crap table, a dart board, a pond containing fish, a grid, an array, a checkerboard, playing cards, a bingo card, a plurality of symbols on a plurality of reels, a map, a garden, a pirate ship, a radar screen, an ocean scene, a forest, a tree, or Easter eggs, where each play area 235 has a plurality of interactive regions, some of which may be assigned as winning regions and the remainder of which may be assigned as losing regions. The number of interactive regions 240 in the play area 235 may generally be at least 10, preferably at least 100, for example from 200 to 10,000.

An example of a gaming system, or architecture which may be implemented in the environment of FIG. 1 and the gaming device of FIG. 2, for example, is illustrated in FIGS. 3 to 18. A house advantage is not shown in the embodiments of FIGS. 3 to 18 for ease of explanation and illustration, but a house advantage may be implemented in other embodiments in accordance with the present invention. As shown in FIGS. 2-18, an interactive play area 235 on display 215 may depict a game board, such as an array or grid 300. The array or grid 300 of the play area 235 may be 10×10 grid of squares 310, each of which is an interactive region. 240. Each square 310 or interactive region 240 may be a winning interactive region or winning square, as determined by the Region Determining Tool 30. After funds are inserted into the bill acceptor 205 and/or coin slot 210, the player may press the play button 225 to start the game and generate the opening game board or interactive area 235 containing grid 300 and squares 310, and the information section 220 containing the amount deposited or bank roll, and the amount of the wager as shown in FIG. 3.

Figure 3:
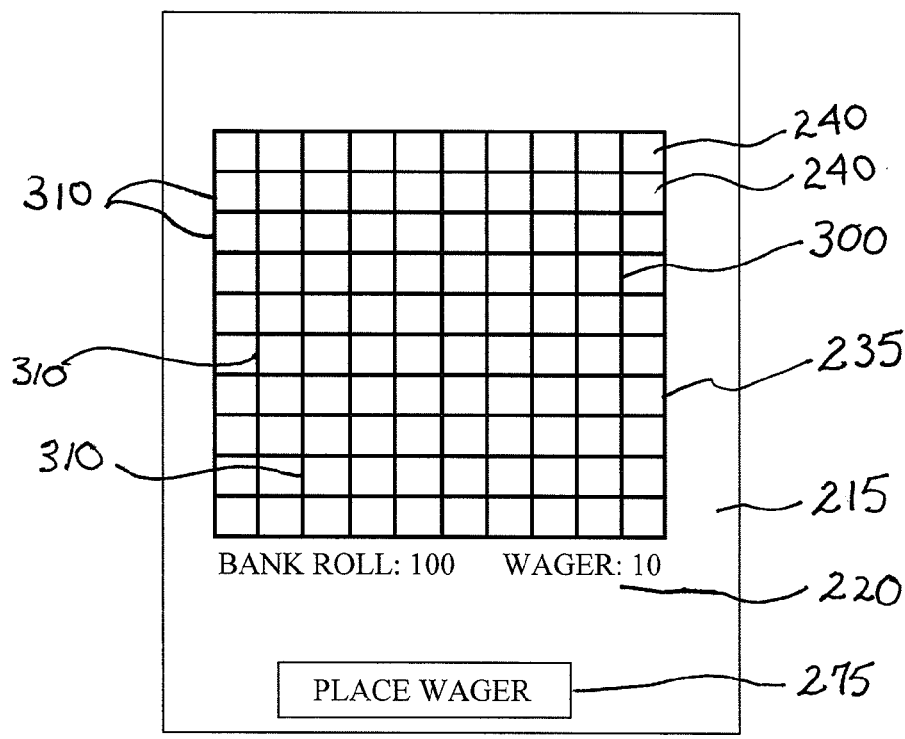
FIG. 3 shows an exemplary display screen with an exemplary game board of the gaming system of FIG. 2 at the start of a game in accordance with aspects of the invention.
Figure 4:
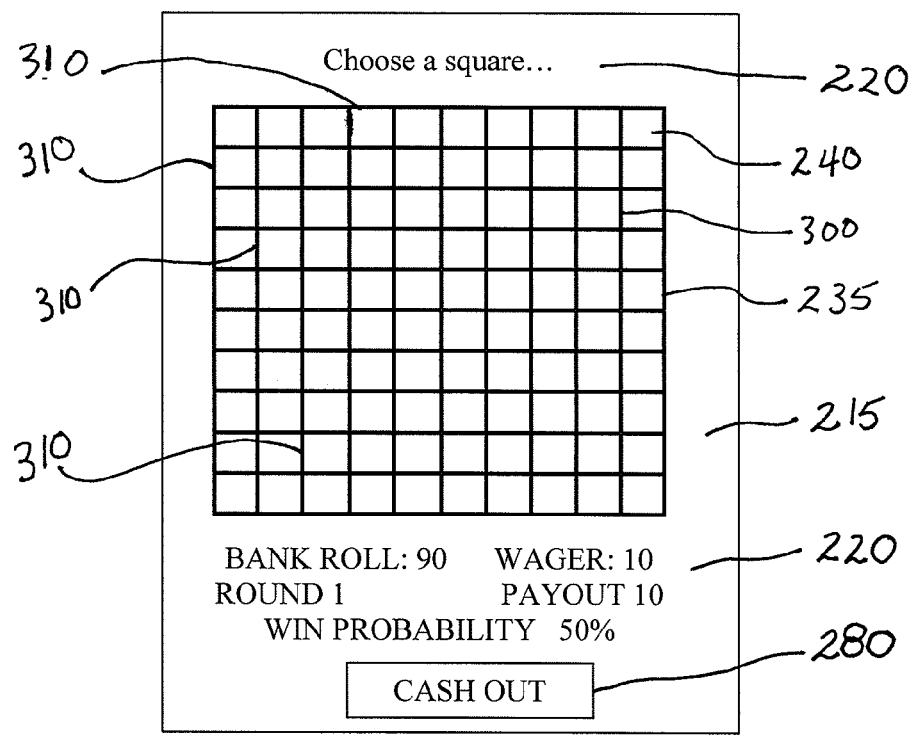
FIG. 4 shows a display screen for a first round of play, after placing a wager in the display screen of FIG. 3, where a player chooses an interactive area upon which to place a wager in accordance with aspects of the invention.

As shown in FIG. 3, an exemplary opening bank roll may be 100 units and an exemplary fixed wager amount may be 10 units as determined and displayed by the Bank Roll Tool 45. After pressing the interactive "Place Wager" button 275 of FIG. 3, then as shown in FIG. 4 a screen display is generated using the Bank Roll Tool 45 with an information section 220 showing the bank roll reduced by the wager amount of 10 units, the wager amount as 10 units, the payout amount as 10 units, the round as round number 1, and the win probability of 50%. The Winning Probability Tool 35 calculates or assigns the probability of winning the round 1 of play and displays the probability of winning on the display 215 in the information section 220. The interactive cash out button 280 is displayed, giving the option of cashing out, and the instruction of "Choose a square . . . " is also displayed in an information section 220 of the display 215. The player then picks a square or interactive region 240 on the game board or play area 235 upon which to wager using an input device such as keypad 250. The first wager of 10 units takes place at even money, a 50% chance to win 10 additional units. The player chooses a square, 50 of which will result in a win and 50 of which will result in a loss.

Figure 5:
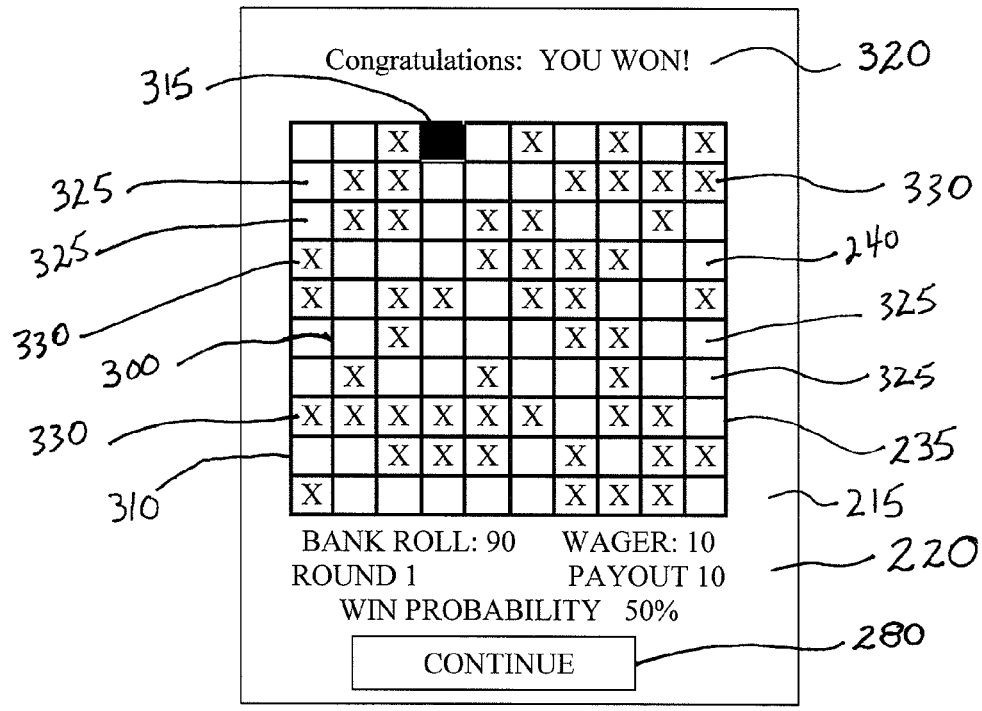
FIG. 5 shows the results of a winning choice made in the display screen of FIG. 4 in accordance with aspects of the invention.

Upon the player making the choice of interactive region upon which to wager, as shown in FIG. 5 the Winning Region Display Tool 40 then displays the chosen interactive region and indicates that the selected region 315 is a winning region on the display 215 in the play area 235 and in an information section 320, which states "Congratulations: YOU WON!" The chosen winning selected region 315 may be indicated by a filled in color such as green or blue or other indicia, such as a "W" or star or dollar sign ($). As shown in FIG. 5 the Winning Region Display Tool 40 also displays which remaining interactive regions 240 are also winning regions and which interactive regions 240 are losing regions. The winning regions may be shown by a different fill-in color such as yellow or white, and the losing regions may be indicated by a third fill-in color such red, or an X or other indicia. In FIG. 5, the other winning regions 325 are shown as white squares, and the losing regions 330 are shown as squares with an "X" therein. As shown in FIG. 5 the number of losing interactive regions or losing squares 330 is 50 and the number of winning interactive regions or winning squares 315, 325 is 50, which is proportional to the probability of winning displayed in the information section 220. The bank roll, wager, round, payout and win probability are again displayed by the Bank Roll tool 45 in information section 220 as shown in FIG. 5. The Bank Roll Tool 45 may also display an interactive continuation button 280 on the display 215 as shown in FIG. 5 for starting the next round of play.

Figure 6:
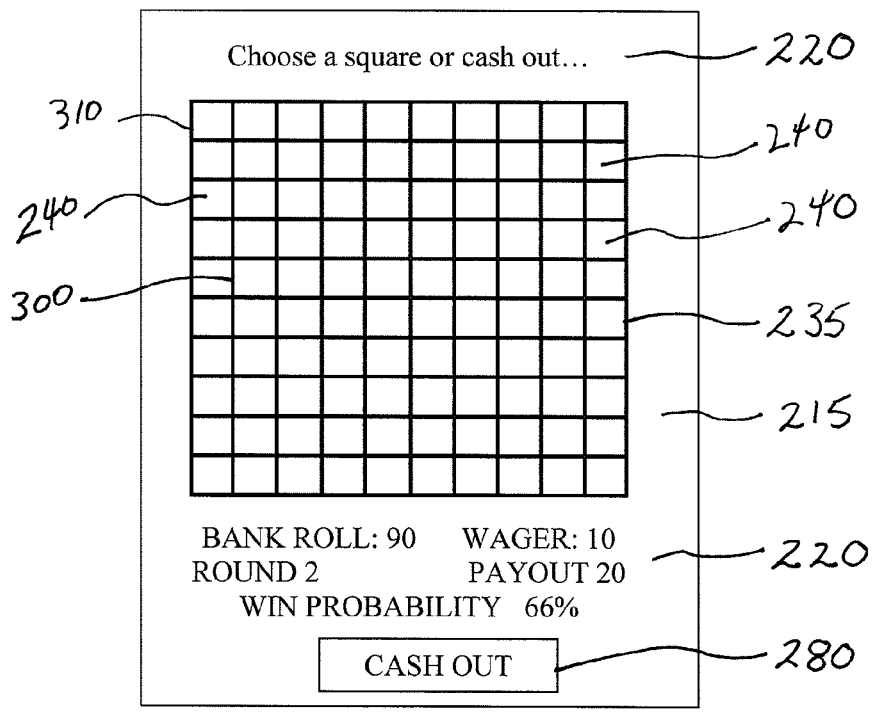
FIG. 6 shows a display screen for a second round of play, after a player chooses to continue in the display screen of FIG. 5 in accordance with aspects of the invention.

After the successful results are revealed as shown in FIG. 5, and the player presses or activates the continuation button 280, then as shown in FIG. 6, the player has the option to either cash out 20 units, which is the new payout shown in the information section 220 by pressing the newly displayed cash out button 280 or choose a new square (on a reset game board with 66 winners) for a 66% chance of success to improve the payout to 30 units. As shown in FIG. 6, upon start of the next round of play, Round 2, the Winning Region Display Tool 40 no longer displays which interactive regions 240 are winning regions and which interactive regions 240 are losing regions.

Figure 7:
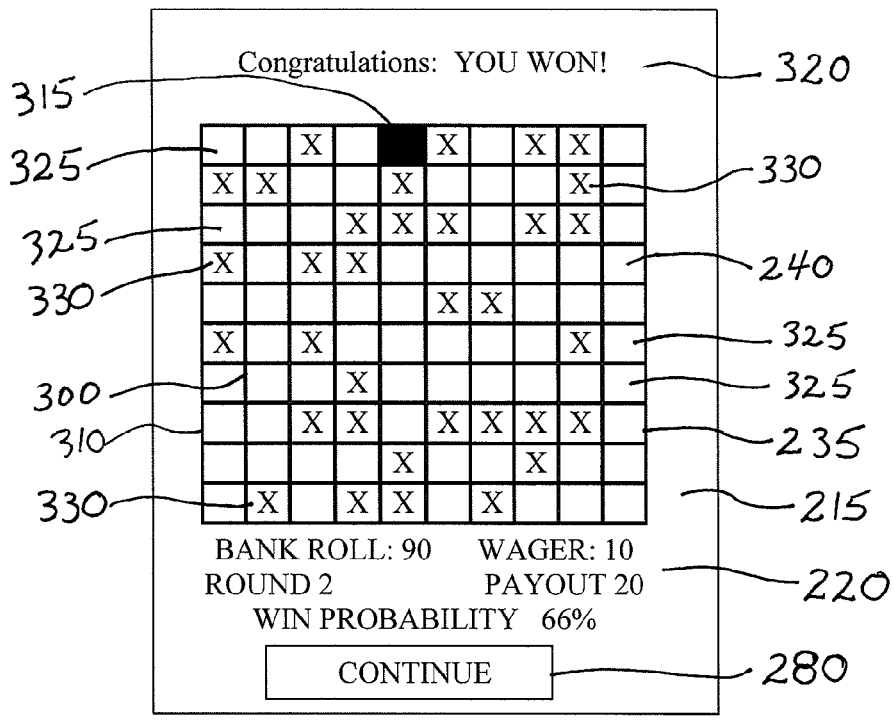
FIG. 7 shows the results of a winning choice made in round 2 in the display screen of FIG. 6 in accordance with aspects of the invention.

As shown in FIG. 7, the player is successful again, picking a winning interactive region 315 (which may randomly be the same or different from the interactive winning region 315 in a previous round). After pressing the continuation button 280 of FIG. 7, the player can continue into round 3 as shown in FIG. 8 and cash out 30 units or take a 75% shot at 40 units, and so forth.

Figure 8:
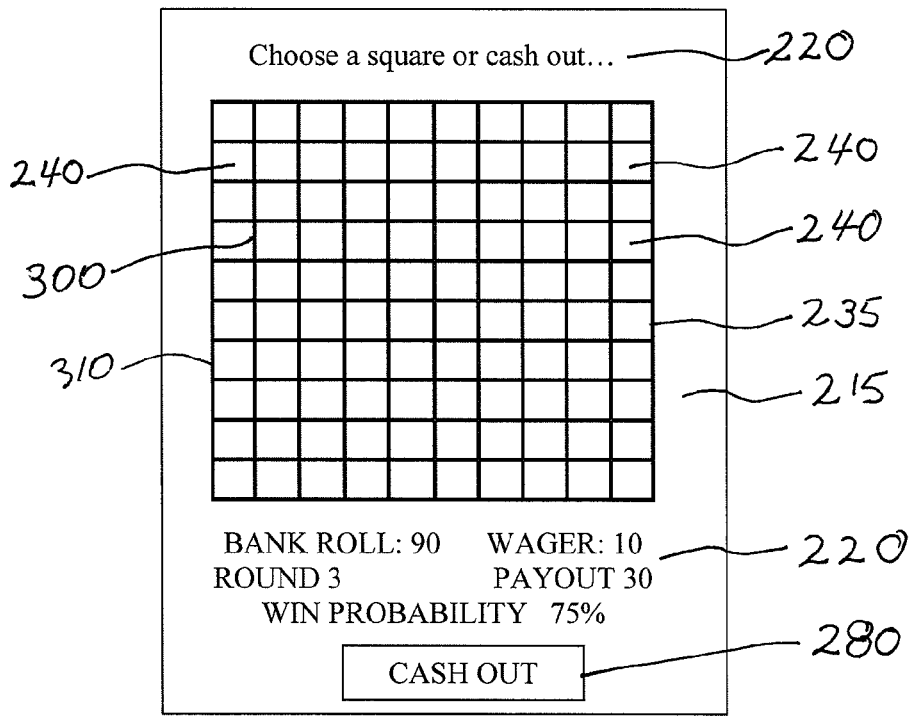
FIG. 8 shows a display screen for a third round of play, after a player chooses to continue in the display screen of FIG. 7 in accordance with aspects of the invention.
Figure 9:
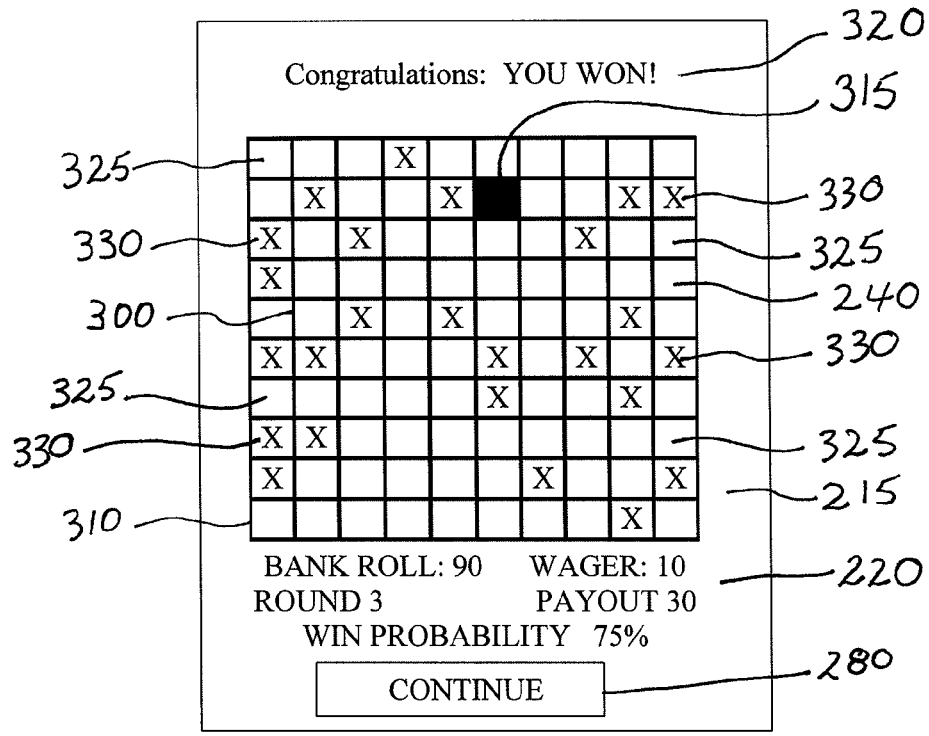
FIG. 9 shows the results of a winning choice made in round 3 in the display screen of FIG. 8 in accordance with aspects of the invention.
Figure 10:
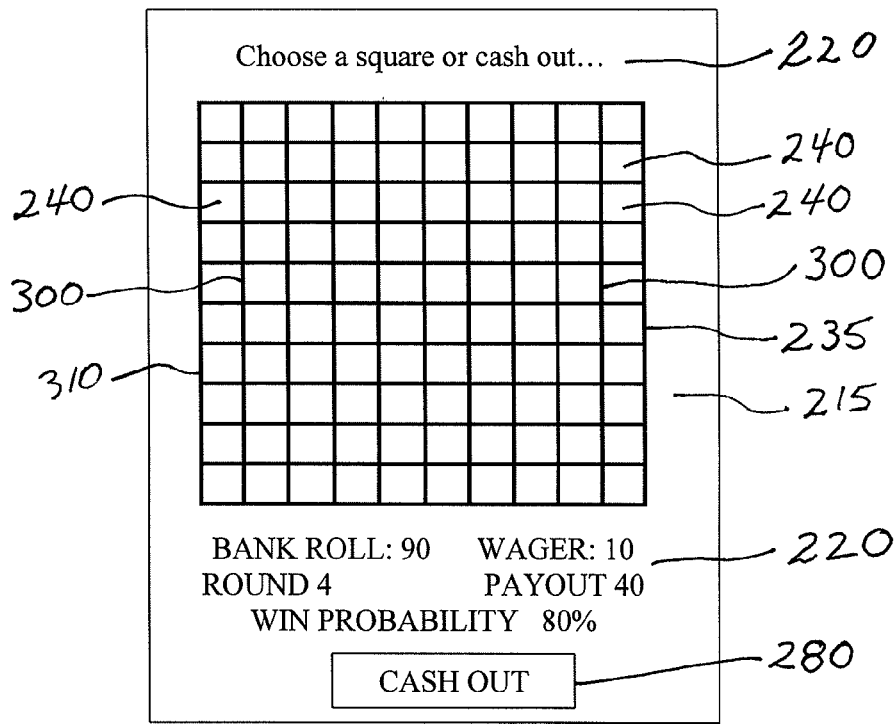
FIG. 10 shows a display screen for a fourth round of play, after a player chooses to continue in the display screen of FIG. 9 in accordance with aspects of the invention.

As shown in FIG. 9, the player having chosen a square 300 of an interactive region 240 in FIG. 8, the player is successful again, picking a winning interactive region 315 as shown in FIG. 9. As shown in FIG. 9, the number of losing regions 330 is 25 and the number of winning regions 325 is 75 which is proportional to the win probability of 75% shown in information section 220. As shown in FIG. 10, upon start of the next round of play, Round 4, the Winning Region Display Tool 40 no longer displays which interactive regions 240 are winning regions and which interactive regions 240 are losing regions. After pressing the continuation button 280 of FIG. 9, the player can continue into round 4 as shown in FIG. 10 and cash out 40 units or take a 80% shot at 50 units.

Figure 11:
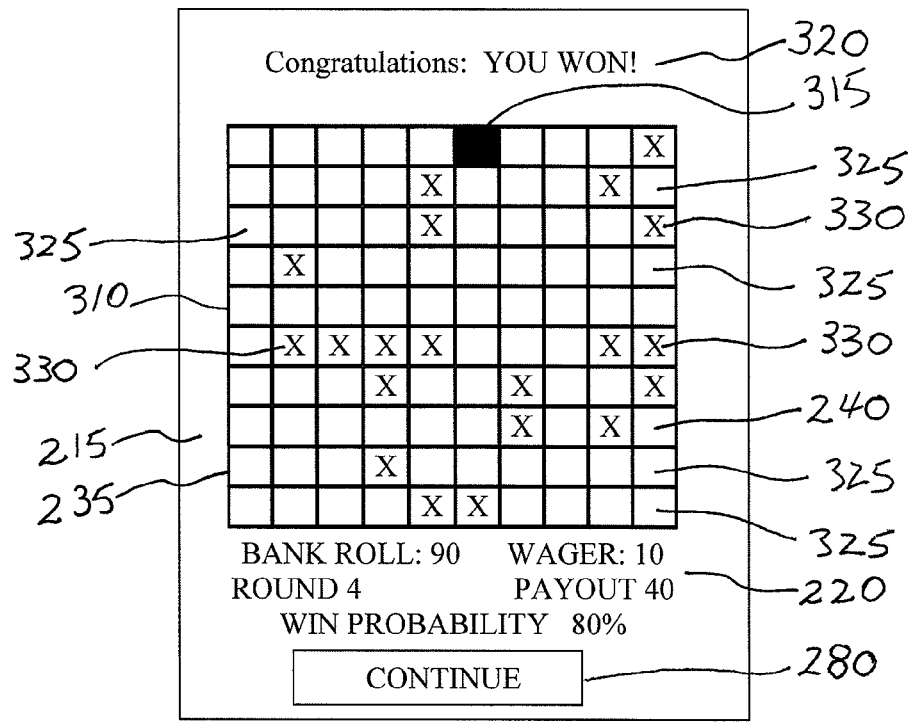
FIG. 11 shows the results of a winning choice made in round 4 in the display screen of FIG. 10 in accordance with aspects of the invention.
Figure 12:
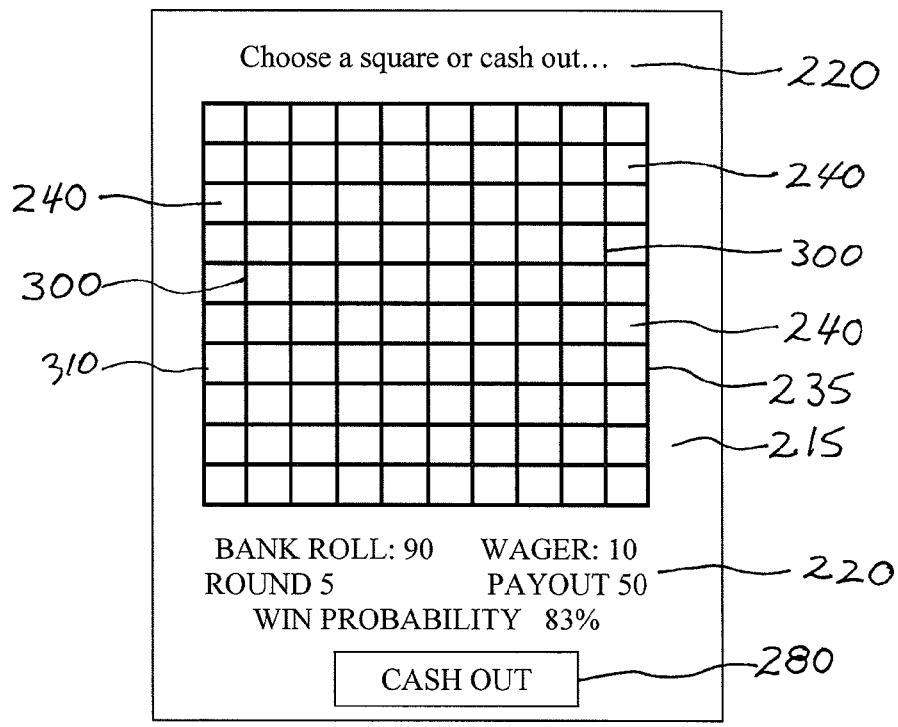
FIG. 12 shows a display screen for a fifth round of play, after a player chooses to continue in the display screen of FIG. 11 in accordance with aspects of the invention.

As shown in FIG. 11, the player having chosen a square 300 of an interactive region 240 in FIG. 10, the player is successful again, picking a winning interactive region 315 as shown in FIG. 11. As shown in FIG. 11, the number of losing regions 330 is 20 and the number of winning regions 325 is 80 which is proportional to the win probability of 80% shown in information section 220. As shown in FIG. 12, upon start of the next round of play, Round 5, the Winning Region Display Tool 40 no longer displays which interactive regions 240 are winning regions and which interactive regions 240 are losing regions. After pressing the continuation button 280 of FIG. 11, the player can continue into round 5 as shown in FIG. 12 and cash out 50 units or take a 83% shot at 60 units.

Figure 13:
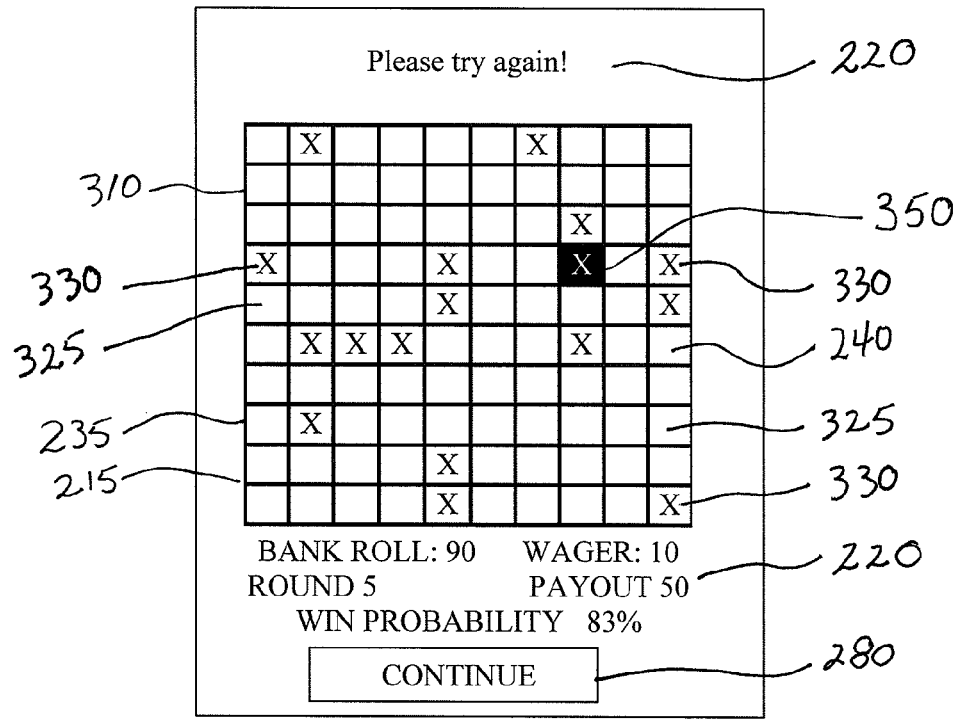
FIG. 13 shows the results of a losing choice made in round 5 in the display screen of FIG. 12 in accordance with aspects of the invention.
Figure 14:
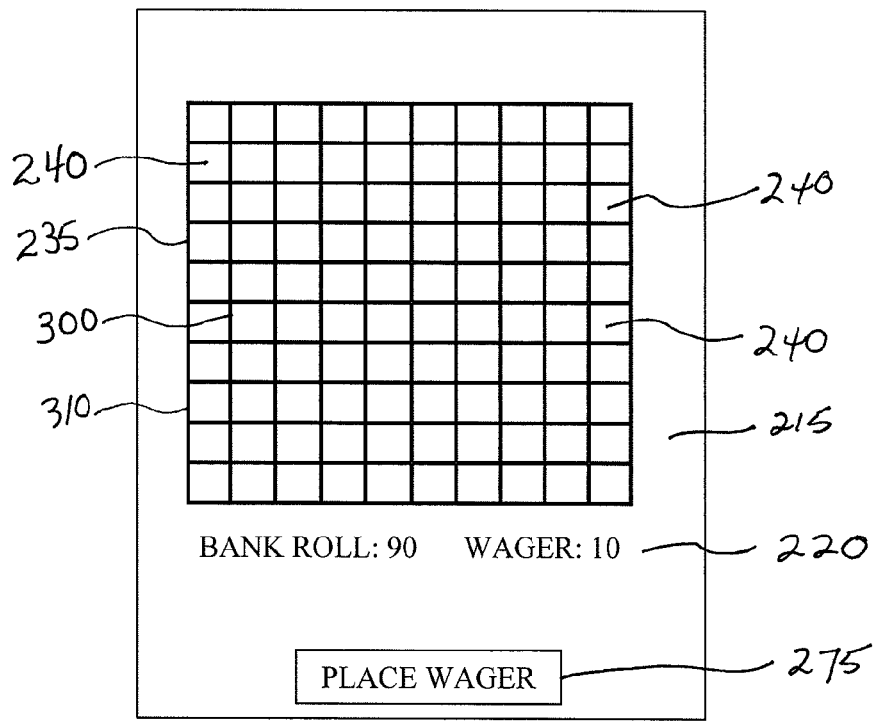
FIG. 14 shows an exemplary display screen with an exemplary game board of the gaming system of FIG. 2 for starting a new series of rounds of play when after losing a round, a player chooses to continue play in the display screen of FIG. 13 in accordance with aspects of the invention.
Figure 15:
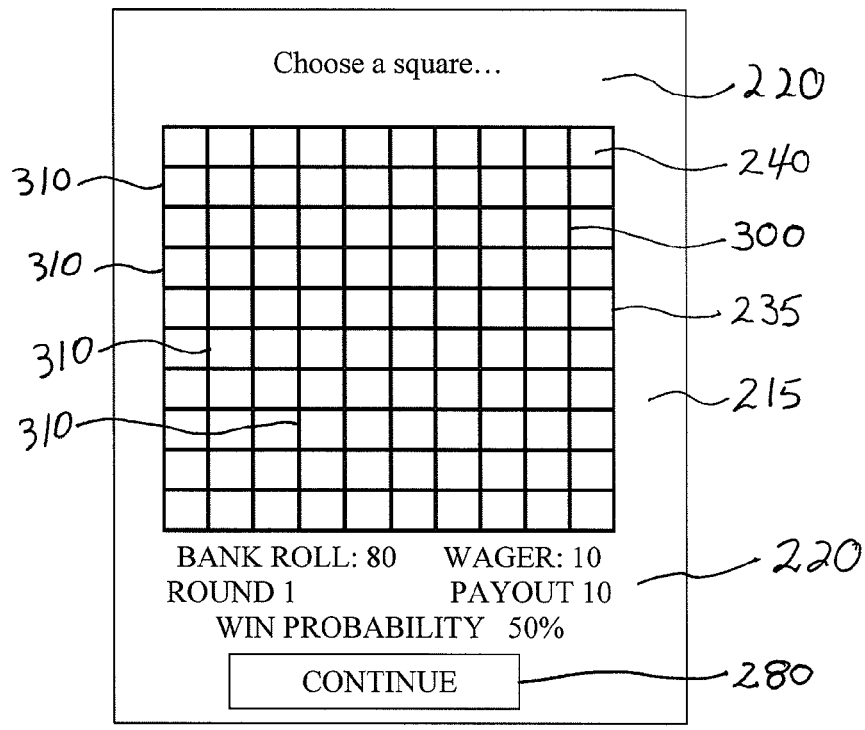
FIG. 15 shows a display screen for a new first round of play, after a player chooses to place a wager in the display screen of FIG. 14 in accordance with aspects of the invention.

As shown in FIG. 13, the player having chosen a square 300 of an interactive region 240 in FIG. 12, the player is not successful, picking a losing interactive region 350 and generating the message "Please try again!" in the information section 220 as shown in FIG. 13. As shown in FIG. 13, the number of losing regions 330, including the chosen losing region 350, is 17 and the number of winning regions 325 is 83 which is proportional to the win probability of 83% shown in information section 220. Upon pressing the continuation button 280 of FIG. 13, as shown in FIG. 14 the Winning Region Display Tool 40 no longer displays which interactive regions 240 are winning regions and which interactive regions 240 are losing regions. The Bank Roll Tool 45 calculates and displays the Bank Roll as 90, and all of the payout is lost and not shown in information section 220. The Place Wager interactive button 275 appears on the display 215. When the wager button 275 is pressed or activated, the Bank Roll Tool recalculates and displays the Bank Roll as 80, reduced by the amount of the wager 10, and sets and displays a new round 1 as shown in FIG. 15. The win probability is shown as 50% for the new round 1. The Winning Probability Tool 35 calculates or assigns the probability of winning the round 1 of play and displays the probability of winning on the display 215 in the information section 220. The player chooses another square to begin round 1 as instructed in the information section of FIG. 15.

Figure 16:
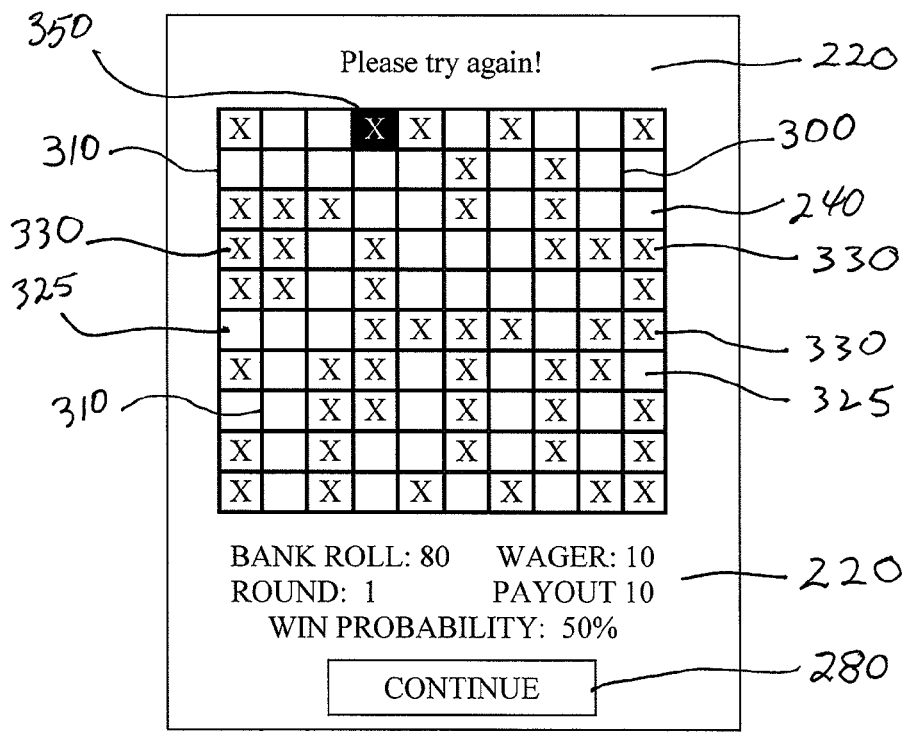
FIG. 16 shows the results of a losing choice made in the new first round in the display screen of FIG. 15 in accordance with aspects of the invention.
Figure 17:
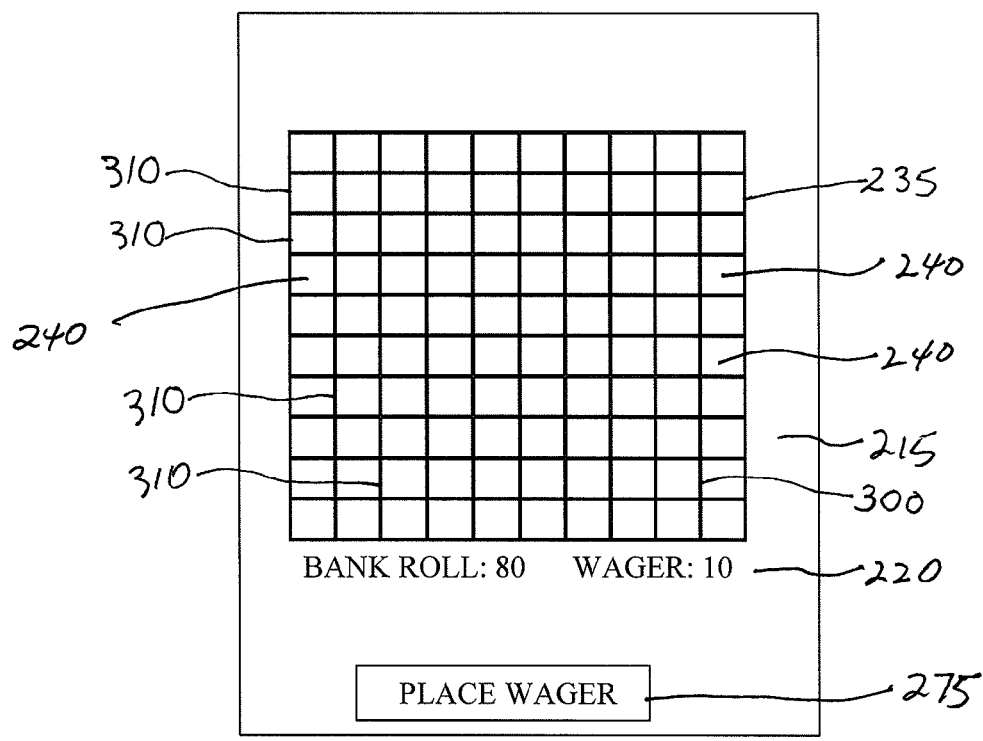
FIG. 17 shows an exemplary display screen with an exemplary game board of the gaming system of FIG. 2 for starting a new series of rounds of play when after losing a round, a player chooses to continue play in the display screen of FIG. 16 in accordance with aspects of the invention.
Figure 18:
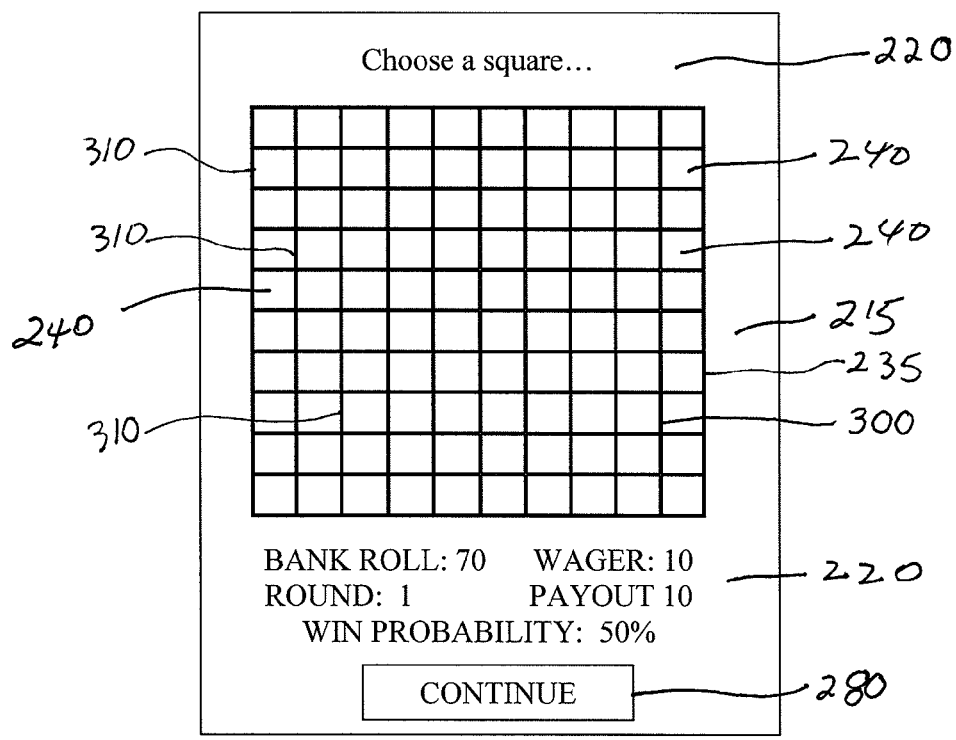
FIG. 18 shows a display screen for a new first round of play, after a player chooses to place a wager in the display screen of FIG. 17 in accordance with aspects of the invention.

As shown in FIG. 16, the player continues and a chooses a square in FIG. 15, but is not successful, picking a losing interactive region 350, and generating the message "Please try again!" in the information section 220 as shown in FIG. 16. As shown in FIG. 16, the number of losing regions 330, including the chosen losing region 350, is 50 and the number of winning regions 325 is 50 which is proportional to the win probability of 50% shown in information section 220. Upon pressing the continuation button 280 of FIG. 16, as shown in FIG. 17 the Winning Region Display Tool 40 no longer displays which interactive regions 240 are winning regions and which interactive regions 240 are losing regions. The Bank Roll Tool 45 calculates and displays the Bank Roll as 80 and the wager is displayed as 10, and all of the payout is lost and not shown in information section 220. The Place Wager interactive button 275 appears on the display 215. When the wager button 275 of FIG. 17 is pressed or activated, the Bank Roll Tool recalculates and displays the Bank Roll as 70 units, which is reduced by the amount of the wager of 10 units, and sets and displays a new round 1 with a payout of 10 units as shown in FIG. 18. The win probability is shown as 50% for the new round 1 in the information section 220 of FIG. 18. The Winning Probability Tool 35 calculates or assigns the probability of winning the round 1 of play and displays the probability of winning on the display 215 in the information section 220. The player chooses another square to begin round 1 as instructed in the information section 220 of FIG. 18.

As shown in FIGS. 4 to 14, for a plurality of five rounds of play, the Bank Roll remained the same at 90 units, and the wager remained the same at 10 units, but the win probability keeps increasing in progressively smaller increments from 50% to 83% until the player loses, but the player only loses the payout.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A gaming system for playing at least a first round of a game comprising:
    a) an acceptor which accepts a source of payment to establish a gaming credit balance for playing a game,
    b) at least one memory device which stores a plurality of instructions,
    c) at least one processor which processes instructions from said at least one memory device, calculates an actual probability of winning in a first round of play and in additional rounds of play, and which processes player choices input from at least one input device,
    d) at least one input device for selecting one of a plurality of interactive regions to the at least one processor,
    e) a display device for displaying a play area generated by the at least one processor, the play area having the plurality of interactive regions where a player may select one of the plurality of interactive regions for wagering a fixed wager amount, wherein the fixed wager amount is subtracted from the gaming credit balance, using the at least one input device, the plurality of interactive regions being winning regions or losing regions as determined by said at least one processor, wherein when the player selects a winning region in the first round of play the at least one processor:
        i) increases the actual probability of winning an increased payout in each of the additional rounds of play over the actual probability of winning in each preceding round of play,
        ii) increases the payout of the preceding round of play in each of the additional rounds of play by the fixed wager amount to obtain the increased payout,
        iii) presents to the player in each of the additional rounds of play the increased payout, the increased probability of winning the increased payout, and the option for the player to continue to play each of the additional rounds of play or to take the payout to end the game, wherein the payout is added to the gaming credit balance,
        iv) changes the winning regions and the losing regions for each of the additional rounds of play, and
    f) a cashout or payout device, when initiated by the player via a cashout button, for paying or crediting the player the gaming credit balance with cash, credit, or other forms of payment,
    wherein when the player selects a losing region, the payout accumulated from each of the rounds of play in the game is lost.

2. A gaming system as claimed in claim 1, wherein the at least one processor randomly determines whether the plurality of interactive regions is the losing region or the winning region.

3. A gaming system as claimed in claim 1, wherein the at least one input device comprises a touch screen, a computer mouse, a joystick, a keyboard, a track ball, or a button.

4. A gaming system as claimed in claim 1, wherein the actual probability of winning calculated by said processor is displayed on said display device.

5. A gaming system as claimed in claim 1, wherein after the player selects one of the plurality of interactive regions, the processor indicates whether the selected interactive region is a winning region or a losing region on the display device, and displays which remaining regions are winning regions and which regions are losing regions.

6. A gaming system as claimed in claim 5, wherein after displaying which of the plurality of interactive regions are winning regions and losing regions, then upon start of each of the additional rounds of play the processor no longer displays which regions are winning regions and which regions are losing regions.

7. A gaming system as claimed in claim 1, wherein the actual probability of winning (W) for a game is calculated by the at least one processor as:

$$W=F \times P$$

where W is the actual winning percentage or real odds or probability of winning for a game, F is the fair odds of winning a game, calculated according to the formula:

$$F=N/(N+1),$$

where N is the number of the round which is being played, and

P is the desired payback percentage, calculated according to the formula:

$$P=100\%-H,$$

where H is the house advantage percentage.

8. A gaming system as claimed in claim 7, wherein the at least one processor assigns a proportion of the winning regions to be about equal to the actual probability of winning and uses a random number generator to randomly determine which of the plurality of interactive regions are winning regions.

9. A gaming system as claimed in claim 1,
wherein the at least one processor determines the player's bankroll or available funds, the round of play, and the payout for the round of play, and
wherein the display device displays the player's bankroll or available funds, the fixed wager amount, the round of play, and the payout for the round of play.

10. A gaming system as claimed in claim 1, wherein the play area is displayed as a spinning wheel, a roulette wheel, a crap table, a dart board, a pond containing fish, a grid, playing cards, a bingo card, a plurality of symbols on a plurality of reels, a map, a garden, a pirate ship, a radar screen, an ocean scene, or Easter eggs.

11. A gaming system as claimed in claim 1, wherein the play area is displayed as a spinning wheel, a roulette wheel, a crap table, or a plurality of symbols on a plurality of reels.

12. A method of operating a gaming system for playing at least a first round of a game, comprising:
a) accepting a source of payment to establish a gaming credit balance for playing a game with a payment acceptor,
b) displaying a play area generated by at least one processor on a display device, the play area having a plurality of interactive regions where a player may select an interactive region for wagering a fixed wager amount, wherein the fixed wager amount is subtracted from the gaming credit balance, using at least one input device, the plurality of interactive regions being winning regions or losing regions as determined by said at least one processor, and
c) accepting an input from the at least one input device of a player for selecting one of the plurality of interactive regions,
d) wherein the at least one processor calculates an actual probability of winning in a first round of play and in additional rounds of play, and when the player selects a winning region in the first round of play the at least one processor:

i) increases the actual probability of winning an increased payout in each of the additional rounds of play over the actual probability of winning in each preceding round of play,
ii) increases the payout of the preceding round of play in each of the additional rounds of play by the fixed wager amount to obtain the increased payout,
iii) presents to the player in each of the additional rounds of play the increased payout, the increased probability of winning the increased payout, and the option for the player to continue to play each of the additional rounds of play or to take the payout to end the game, wherein the payout is added to the gaming credit balance,
iv) changes the winning regions and the losing regions for each of the additional rounds of play, and
e) paying or crediting the player the gaming credit balance with cash, credit, or other forms of payment with a cashout or payout device, when initiated by the player via a cashout button, and
when the player selects a losing region, the payout accumulated from each of the rounds of play in the game is lost.

13. A method as claimed in claim 12, wherein the at least one processor randomly determines whether the plurality of interactive regions is the losing region or the winning region.

14. A method as claimed in claim 12, wherein the at least one input device comprises a touch screen, a computer mouse, a joystick, a keyboard, a track ball, or a button.

15. A method as claimed in claim 12, wherein the actual probability of winning calculated by said processor is displayed on said display device.

16. A method as claimed in claim 12, wherein after the player selects one of the plurality of interactive regions, the at least one processor indicates whether the selected interactive region is a winning region or a losing region on the display device, and displays which remaining regions are winning regions and which regions are losing regions.

17. A method as claimed in claim 16, wherein after displaying which of the plurality of interactive regions are winning regions and which regions are losing regions, then upon start of the next round of play the at least one processor no longer displays which regions are winning regions and which regions are losing regions.

18. A method as claimed in claim 12, wherein the actual probability of winning (W) for a game is calculated by the at least one processor as:

$$W=F \times P$$

where W is the actual winning percentage or real odds or probability of winning for a game, F is the fair odds of winning a game, calculated according to the formula:

$$F=N/(N+1),$$

where N is the number of the round which is being played, and

P is the desired payback percentage, calculated according to the formula:

$$P=100\%-H,$$

where H is the house advantage percentage.

19. A method as claimed in claim 18, wherein the at least one processor assigns a proportion of the winning regions to be about equal to the actual probability of winning and uses a random number generator to randomly determine which of the plurality of interactive regions are winning regions.

20. A method as claimed in claim 12,
wherein the at least one processor determines the player's bankroll or available funds, the round of play, and the payout for the round of play, and
wherein the display device displays the player's bankroll or available funds, the fixed wager amount, the round of play, and the payout for the round of play.

21. A method as claimed in claim 12, wherein the play area is displayed as a spinning wheel, a roulette wheel, a crap table, a dart board, a pond containing fish, a grid, playing cards, a bingo card, or a plurality of symbols on a plurality of reels, a map, a garden, a pirate ship, a radar screen, an ocean scene, or Easter eggs.

22. A method as claimed in claim 12, wherein the play area is displayed as a spinning wheel, a roulette wheel, a crap table, or a plurality of symbols on a plurality of reels.

\* \* \* \* \*